(12) United States Patent  
Kohler (10) Patent No.: US 11,856,113 B2  
(45) Date of Patent: Dec. 26, 2023

(54) SINGLE-CERTIFICATE MULTI-FACTOR AUTHENTICATION

(71) Applicant: The Alfred E. Mann Foundation for Scientific Research, Valencia, CA (US)

(72) Inventor: Daniel G. Kohler, Stevenson Ranch, CA (US)

(73) Assignee: THE ALFRED E. MANN FOUNDATION FOR SCIENTIFIC RESEARCH, Valencia, CA (US)

( * ) Notice: Subject to any disclaimer, the term of this patent is extended or adjusted under 35 U.S.C. 154(b) by 0 days.

(21) Appl. No.: 17/548,326

(22) Filed: Dec. 10, 2021

(65) Prior Publication Data

US 2022/0191049 A1 Jun. 16, 2022

Related U.S. Application Data

(60) Provisional application No. 63/123,979, filed on Dec. 10, 2020.

(51) Int. Cl.
*H04L 9/40* (2022.01)
*H04L 9/32* (2006.01)
*H04L 9/08* (2006.01)

(52) U.S. Cl.
CPC .......... *H04L 9/3268* (2013.01); *H04L 9/0825* (2013.01); *H04L 9/3231* (2013.01); *H04L 9/3242* (2013.01); *H04L 9/3247* (2013.01)

(58) Field of Classification Search
CPC ... H04L 9/3268; H04L 9/0825; H04L 9/3231; H04L 9/3242; H04L 9/3247
See application file for complete search history.

(56) References Cited

U.S. PATENT DOCUMENTS

| 5,610,982 | A | * | 3/1997 | Micali | H04L 9/3255 |
| | | | | | 713/180 |
| 6,625,733 | B1 | * | 9/2003 | Yasukura | G06Q 99/00 |
| | | | | | 726/28 |
| 9,143,504 | B1 | * | 9/2015 | Shi | G06F 21/62 |
| 11,431,510 | B1 | * | 8/2022 | Stapleton | H04L 9/3268 |

(Continued)

OTHER PUBLICATIONS

International Search Report and Written Opinion for Application No. PCT/US2021/062938, dated Mar. 15, 2022, 12 pages.

(Continued)

*Primary Examiner* — Ghodrat Jamshidi  
(74) *Attorney, Agent, or Firm* — Lewis Roca Rothgerber Christie LLP (57) ABSTRACT

A method of multi-factor authentication includes receiving, by a first electronic device, a partial digital certificate including partial certificate information omitting at least one authentication factor from complete certificate information, and a signature encrypting a first hash of the complete certificate information with a certificate authority private key. The method also includes obtaining the first hash by decrypting, by the first electronic device, the signature with a certificate authority public key corresponding to the certificate authority private key; generating, by the first electronic device, a second hash based on the partial certificate information in the partial digital certificate and the at least one authentication factor; and comparing, by the first electronic device, the second hash to the first hash.

34 Claims, 7 Drawing Sheets

(56) References Cited

U.S. PATENT DOCUMENTS

| | | | |
|---|---|---|---|
| 11,743,257 B2* | 8/2023 | Goldstein | H04L 63/0884 726/1 |
| 2006/0023887 A1* | 2/2006 | Agrawal | H04W 12/047 380/277 |
| 2007/0094494 A1* | 4/2007 | Banerjee | H04L 9/085 713/157 |
| 2009/0249074 A1* | 10/2009 | Madhavan | H04L 9/3263 713/176 |
| 2013/0227647 A1* | 8/2013 | Thomas | H04L 63/0823 726/3 |
| 2017/0078881 A1* | 3/2017 | Lee | H04L 9/0872 |
| 2017/0228965 A1* | 8/2017 | Irwin, Jr. | G06K 19/06037 |
| 2017/0366536 A1* | 12/2017 | Robison | H04L 9/3226 |
| 2018/0190051 A1 | 7/2018 | Outwater et al. | |
| 2019/0289002 A1 | 9/2019 | Vegh et al. | |
| 2020/0005290 A1* | 1/2020 | Madisetti | H04L 9/3239 |
| 2020/0242585 A1* | 7/2020 | Meere | G06Q 20/204 |
| 2021/0011991 A1* | 1/2021 | Schmitz | G06F 21/85 |
| 2021/0184869 A1* | 6/2021 | Trere | H04L 9/3273 |
| 2022/0191044 A1* | 6/2022 | Kurita | H04L 9/3263 |
| 2023/0007086 A1* | 1/2023 | Aggarwal | H04W 12/63 |

OTHER PUBLICATIONS

Menezes et al., "Handbook of Applied Cryptography," Chapter 13: Key Management Techniques, CRC Press, Inc., 1997, 49 pages.
International Preliminary Report on Patentability for Application No. PCT/US2021/062938, dated Jul. 15, 2022, 6 pages.

* cited by examiner

SINGLE-CERTIFICATE MULTI-FACTOR AUTHENTICATION

CROSS-REFERENCE TO RELATED APPLICATION(S)

This application claims priority to and the benefit of provisional Application No. 63/123,979 entitled SERVERLESS SINGLE CERTIFICATE MULTI-FACTOR AUTHENTICATION, filed on Dec. 10, 2020, the entire content of which is hereby incorporated by reference.

FIELD OF THE PRESENT DISCLOSURE

The present disclosure relates to methods, and corresponding systems, for providing single-certificate multi-factor authentication for electronic devices.

BACKGROUND

Electronic devices communicating over a network, wired or wireless, frequently need to communicate privacy-sensitive or potentially privacy-sensitive information. This information may include, but is not limited to: personally-identifiable information; credit card numbers; addresses; medical records; passwords; confidential documents; and any other records of an interaction that an entity on the network may wish to keep private. Accordingly, it is important to authenticate that another entity communicating on the network is actually the intended recipient for transmitted communications.

Authentication of an entity's identity on a network or other secure system is commonly described in relation to "factors" or "credentials." Generally, these factors are described as being grouped into three types: things you know (knowledge); things you have (possession); and, things you are (inherence). Authentication that requires a combination of different types of factors is commonly referred to as "multi-factor authentication" ("MFA"). This is distinct from other forms of authentication that require multiple authenticating components within the same factor, e.g., "dual authentication" wherein two of the same types of factors, frequently knowledge factors, are required for authentication. Using multi-factor authentication may increase security and provide a more robust authentication process than processes that use only a single factor or dual authentication.

Over time, as communication networks became more advanced, the need for asymmetric authentication, wherein the sender and recipient are holders of different information used to verify each other's identity, became more important and, eventually, commonplace. As will be appreciated by those skilled in the art, there have been many solutions for allowing authentication of entities communicating on a network, and means for keeping authenticated communications private, but the most common authentication means in use today are Secure Sockets Layer (SSL) certificates that facilitate websites moving from Hypertext Transfer Protocol (HTTP) to the encrypted, and thus more secure, Hypertext Transfer Protocol Secure (HTTPS). A brief description of the authentication process using an SSL certificate is provided below to provide further context for the present disclosure.

SSL certificates are commonly used in the Transport Layer Security (TLS) protocol as a means of authenticating an entity on a network with whom a user wishes to open an encrypted communication channel. The SSL certificate thus offers one factor, possession of the certificate, that can be used for authentication. Multiple pieces of information are contained by the SSL certificates including, but not limited to: the domain the certificate is issued for; the certificate authority that issued the certificate; subdomains associated with the certificate; the issue date; the expiration date; a public key, or other information used for asymmetric encryption; and the certificate authority's digital signature. These pieces of information can be used to check the validity of the certificate, as well as authenticate that the certificate is genuinely issued by a trusted certificate authority.

However, using a single factor of authentication presents a security vulnerability due to the possibility of another entity (i.e., a man-in-the-middle ("MITM")) intercepting or otherwise obtaining a copy of the authentication factor. Additionally, related security methods that provide MFA often assume and require connection to additional servers, or involve processes that may be trivial for a server but are prohibitively costly for a low-power device, or require user input to achieve multi-factor authentication.

SUMMARY

The present disclosure relates to various embodiments of a method of multi-factor authentication. In one embodiment, the method of multi-factor authentication includes receiving, by a first electronic device, a partial digital certificate including partial certificate information omitting at least one authentication factor from complete certificate information, and a signature encrypting a first hash of the complete certificate information with a certificate authority private key. The method also includes obtaining the first hash by decrypting, by the first electronic device, the signature with a certificate authority public key corresponding to the certificate authority private key; generating, by the first electronic device, a second hash based on the partial certificate information in the partial digital certificate and the at least one authentication factor; and comparing, by the first electronic device, the second hash to the first hash.

The method may also include transmitting, from a second electronic device to the first electronic device, the partial digital certificate, and authenticating the second electronic device in response to the second hash matching the first hash.

The at least one authentication factor may include a set of authentication factors.

The digital signature may be a set of digital signatures, and each digital signature of the set of digital signatures may correspond to the partial certificate information and one of the set of authentication factors.

The digital signature may correspond to the partial certificate information and each of the set of authentication factors.

The digital signature may be a set of digital signatures. A first digital signature of the set of digital signatures may correspond to the partial certificate information and one authentication factor having a first value, and a second digital signature of the set of digital signatures corresponding to the partial certificate information and the one authentication factor having a second value different than the first value.

The at least one authentication factor may include a knowledge factor, such as a password, a pin code, a unique identifier of the second electronic device, or an answer to a secret question.

The at least one authentication factor may include an inherence factor, such as a fingerprint, an iris scan, a vocal sample, or a speech pattern.

The method may include receiving, by the first electronic device, the at least one authentication factor from a second electronic device separate from the first electronic device.

The method may include supplying, by the first electronic device, the at least one authentication factor.

The at least one authentication factor may include plaintext information.

The first electronic device may be a mobile electronic device or an implantable medical device.

A memory of the first electronic device may store the certificate authority public key.

The signature may be formed utilizing a signing algorithm, such as a standard Digital Signature Algorithm (DSA), an elliptic curve digital signature algorithm (ECDSA), a Rivest-Shamir-Adleman (RSA) algorithm, or an elliptic curve RSA algorithm (ECRSA).

A method of multi-factor authentication according to another embodiment of the present disclosure includes transmitting, by a second electronic device, an authentication request to a first electronic device. The authentication request includes a partial digital certificate including partial certificate information omitting at least one authentication factor from complete certificate information, and a signature encrypting a first hash of the complete certificate information with a certificate authority private key.

The present disclosure also relates to various embodiments of a system for single-certificate multi-factor authentication. In one embodiment, the system includes a first electronic device and a second electronic device. Each of the first electronic device and the second electronic device include a processing unit, a memory device containing instructions executable by the processing unit, a communication module, and a system bus communicably linking the processing unit, the memory device, and the communication module. The instructions stored in the memory device of the second electronic device, when executed by the processing unit of the second electronic device, cause the communication module of the second electronic device to transmit an authentication request to the first electronic. The authentication request includes a partial digital certificate including partial certificate information omitting at least one authentication factor from complete certificate information, and a signature encrypting a first hash of the complete certificate information with a certificate authority private key. The instructions stored in the memory device of the first electronic device, when executed by the processing unit of the first electronic device, cause the first electronic device to decrypt the signature with a certificate authority public key corresponding to the certificate authority private key to obtain the first hash, generate a second hash based on the partial certificate information in the partial digital certificate and the at least one authentication factor, and compare the second hash to the first hash.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable system or method of multi-factor authentication.

BRIEF DESCRIPTION OF THE DRAWINGS

The accompanying drawings, together with the specification, illustrate example embodiments of the present disclosure. These drawings, together with the description, serve to better explain aspects and principles of the present disclosure.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. As used herein, the term "and/or" includes any and all combinations of one or more of the associated listed items.

It will be understood that, although the terms "first", "second", "third", "external", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the present disclosure.

Example embodiments of the present disclosure will now be described with reference to the accompanying drawings. In the drawings, the same or similar reference numerals refer to the same or similar elements throughout. As used herein, the use of the term "may," when describing embodiments of the present disclosure, refers to "one or more embodiments of the present disclosure."

Some embodiments of the present disclosure are directed to providing multi-factor authentication using a "partial"

digital certificate. A partial certificate may include an incomplete listing of information, i.e., at least some component piece of information has been omitted, but still contain a hash of the complete listing of information normally provided. The omitted information may include, in some embodiments, a textual field containing a password or other string of text relating to the certificate. As will be appreciated by one skilled in the art, any component information from the listing of information contained in the complete certificate could be omitted to form a partial digital certificate. This may include, but is not limited to, passwords, time stamps, GPS coordinates, unique device identification numbers, information describing biometric data, and any combination of these component pieces of information. For some types of information, such as biometric identifiers, a unique character string or hash value corresponding to the raw biometric data may be presented in the plain text. As will be appreciated by one skilled in the art, any suitable piece of information normally contained within the listing of information of a complete certificate can be omitted to create a partial certificate so long as the omitted information is included in the information used to generate the signature (i.e., an encrypted hash) for the partial digital certificate. The partial digital certificate can, when created according to the present disclosure, only be completed, i.e., placed into a form that will correctly verify the hash, if the omitted information is supplied by the authenticating device in the same form as it was in when used to generate the hash. Accordingly, even if the applicant device with the partial digital certificate is hacked, security will not be compromised because the partial digital certificate alone is insufficient to gain access to any host device without supplying the missing authentication factor(s).

If the partial certificate is kept private, possession of the partial certificate is a first authentication factor. The omitted component information of the partial certificate provides a way for the recipient of the partial certificate to achieve multi-factor authentication by supplying the missing component information as an additional authentication factor. By way of non-limiting example, a partial certificate may omit a text field corresponding to a password. Authentication of the device supplying the partial certificate can thus be achieved by looking at a possession factor, the partial certificate, and a knowledge factor, i.e., providing the missing password. Likewise, in another non-limiting example, information describing biometric identifiers for the user of the authenticating device may be omitted from the partial certificate thereby providing a means for multi-factor authentication using possession of the partial certificate and an inherence factor (e.g., the biometric identifier information).

The omitted information from the partial certificate can thus be thought of as an authentication factor provided for by the partial certificate beyond merely the possession-based factor that is typically provided by a certificate. Additionally, use of the partial certificate may, in some embodiments, be utilized in an authentication process similar to that of complete certificates, like SSL certificates, so that many of the same widely adopted authentication steps and/or operations can be utilized. Exemplary embodiments of the present disclosure incorporating use of partial certificates are described in regards to the figures identified below.

It will also be appreciated by those skilled in the art that two or more component pieces of information (e.g., two or more pieces of information corresponding to the same or different authentication factor type) may be omitted from a complete certificate to form a partial digital certificate. Omitting two or more component pieces of information enables multiple factors of authentication to be enforced because each omitted component of information provides another factor of authentication. In one embodiment in which two or more authentication factors are omitted, the hash may correspond to a combination of the partial certificate information with all of all the omitted authentication factors such that authentication requires all of the omitted component pieces of information to be provided.

In another embodiment in which two or more authentication factors are omitted, two or more hashes (i.e., a plurality of hashes) may be provided corresponding to the partial certificate information combined with a different omitted authentication factor. Accordingly, in one or more embodiments, authentication may require only one of the omitted component pieces of information to be provided (i.e., each hash of the two or more hashes in the partial digital certificate provides an alternative means (an "or" condition) for verification).

Figure 1:
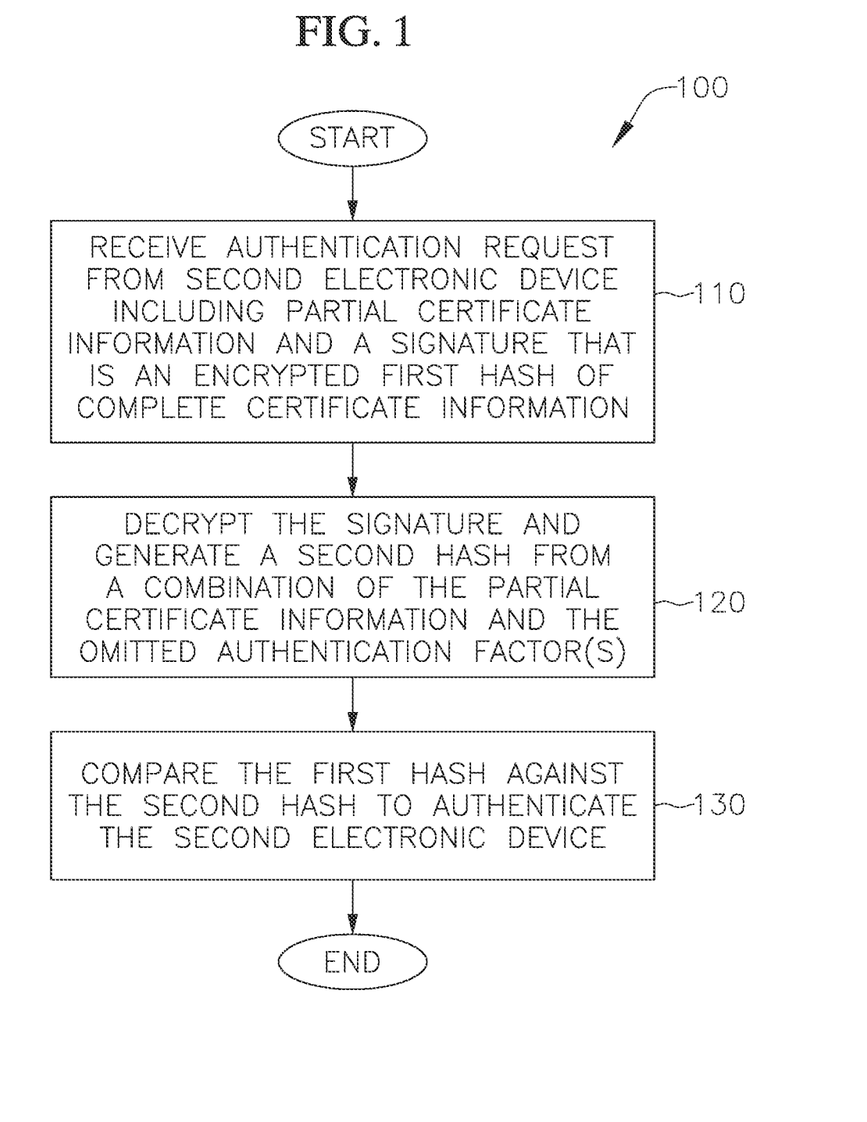
FIG. 1 shows a flowchart depicting a method for single-certificate multi-factor authentication according to one embodiment of the present disclosure from the perspective of a first electronic device.

FIG. 1 shows a flowchart depicting a method 100 for single-certificate multi-factor authentication according to one embodiment of the present disclosure from the perspective of a first electronic device. The method depicted in FIG. 1 proceeds from the perspective of a first electronic device authenticating a second electronic device. At step 110, the first electronic device receives an authentication request from the second electronic device. The authentication request may, in some embodiments, include a partial digital certificate. The partial certificate includes partial certificate information (e.g., information relevant to the identity of the certificate holder, certificate issuer, etc.), but it omits at least one authentication factor from complete certificate information. In one or more embodiments, the at least one authentication factor omitted from the partial digital certificate may be a knowledge factor (e.g., a password; an answer to a secret question, a PIN code; an ID number, or other personal information), a possession factor (e.g., an ID card or chip; a smart device such as a smart phone or tablet computer), and/or an inherence factor (e.g., biometric data, such as a fingerprint, an iris scan, a vocal sample, or speech patterns, other attributes specific to the identity of a device or a user of the device on the network or other secure system). Those skilled in the art will appreciate that factors relating to location, while sometimes described as a unique type of factor, can also be grouped into either knowledge factors or inherence factors depending on the context in which the location factor is being used. As such, and for the purposes described herein, location-related factors will be considered as knowledge or inherence factors. In one or more embodiments, the partial certificate may omit two or more authentication factors, and all of the omitted authentication factors may be of the same authentication factor type, or the omitted authentication factors may be from two or more different authentication factor types.

In one or more embodiments, the partial digital certificate also includes a signature encrypting a first hash of the complete certificate information (i.e., an encrypted hash of the partial certificate information combined with the one or more omitted authentication factors) with a certificate authority's private key (i.e., signature=encrypt [hash(Complete Certificate Information), Private Key]). The signature may be generated with any suitable digital signing algorithm, such as a standard Digital Signing Algorithm (DSA), an elliptic curve digital signature algorithm (ECDSA), a Rivest-Shamir_Adleman (RSA) algorithm, or an elliptic curve RSA algorithm (ECRSA).

In one or more embodiments in which the partial certificate information omits two or more authentication factors (i.e., a plurality of authentication factors), the partial digital certificate may include two or more digital signatures encrypting two or more first hashes (i.e., a plurality of digital signatures encrypting a respective plurality of first hashes) corresponding to combinations of the partial certificate information with a different omitted authentication factor(s). For example, in one or more embodiments, the partial digital certificate may include a first digital signature (i.e., a first encrypted hash) corresponding to a combination of the partial certificate information with one omitted authentication factor, and a second digital signature (i.e., a second encrypted hash) corresponding to a combination of the partial certificate information with another omitted authentication factor.

In one or more embodiments, the partial digital certificate may include two or more digital signatures encrypting two or more first hashes corresponding to combinations of the partial certificate information with the same omitted authentication factor (e.g., a single omitted authentication factor), but having two or more different values for that omitted authentication factor. For instance, in one or more embodiments, an omitted authentication factor may be a password field, and the partial digital certificate may include a first digital signature (i.e., a first encrypted hash) corresponding to a combination of the partial certificate information with a first acceptable password, and a second digital signature (i.e., a second encrypted hash) corresponding to a combination of the partial certificate information with a second acceptable password.

At step 120, the first electronic device decrypts the signature of the partial digital certificate with a certificate authority's public key corresponding to the certificate authority's private key to obtain the first hash. Additionally, at step 120, the first electronic device combines the partial certificate information (obtained in task 110) with the at least one omitted authentication factor, and generates a second hash from the combination of the partial certificate information and the at least one omitted authentication factor. The one or more omitted authentication factors may be supplied by the first electronic device or the second electronic device. For example, in one or more embodiments, the second electronic device may transmit one or more authentication factors (e.g., a password, a PIN number, an answer to a secret question, biometric information of a user of the second electronic device, or combinations thereof) to the first electronic device. In one or more embodiments, the first electronic device may supply or obtain the one or more authentication factors (e.g., the first electronic device may obtain a time stamp from an internal clock, may obtain GPS coordinates from a GPS device, or may supply a unique device identification number of the second electronic device).

Proceeding to step 130, the first electronic device compares the second hash against the first hash to verify the authenticity of the certificate provided by the second electronic device. The second hash will match the first hash only if the proper authentication factor(s) that was/were omitted from the partial digital certificate is/are supplied in the correct form and place within the partial certificate to recreate a copy of the complete certificate. Thus, by comparing the first hash against the second hash, the accuracy of the generated complete certificate can be verified by the first electronic device. Step 130 thus completes the multi-factor authentication process using the partial certificate and at least one omitted authentication factor. Additionally, in one or more embodiments, the first electronic device verifies the authenticity of the complete certificate by verifying the digital signature. The process used to verify the digital signature must be consistent with the digital signing algorithm used to generate the signature in the partial digital certificate. The digital signing algorithm used may, in some embodiments, be the standard Digital Signing Algorithm (DSA), an elliptic curve digital signature algorithm (ECDSA), a Rivest-Shamir_Adleman (RSA) algorithm, or an elliptic curve RSA algorithm (ECRSA). Furthermore, the public key used in the digital signature verification process must correspond to the private key used in the digital signing process.

Figure 2:
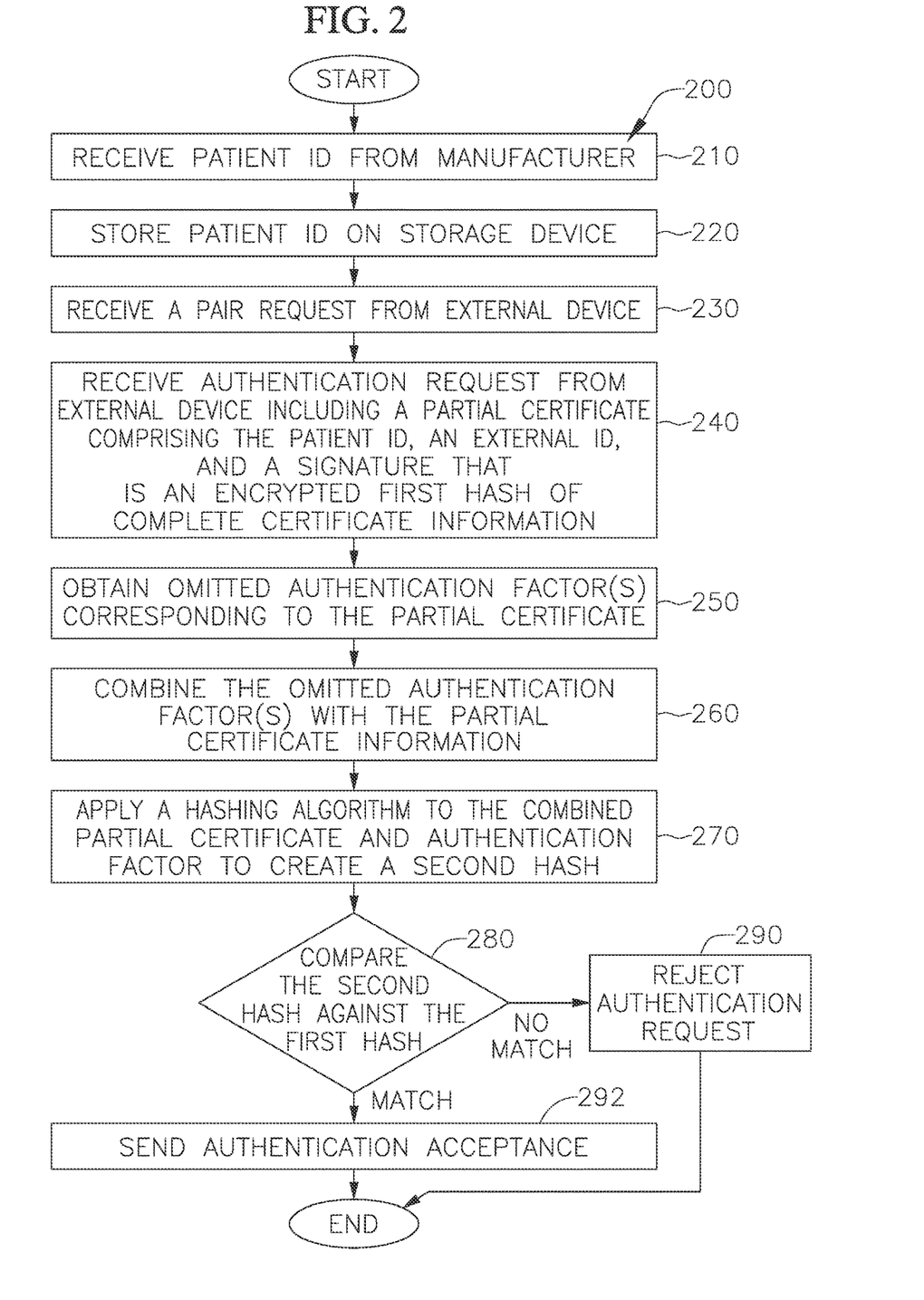
FIG. 2 shows a flowchart depicting an alternative method for single-certificate multi-factor authentication according to one embodiment of the present disclosure from the perspective of a first electronic device.

FIG. 2 shows a flowchart depicting an alternative method 200 for single-certificate multi-factor authentication according to one embodiment of the present disclosure from the perspective of an implantable medical device. As will be appreciated by one skilled in the art, the implanted medical device may be embodied as any medical device configured to communicate wirelessly over a network while implanted in a patient's body. Such devices may include, but are not limited to, pacemakers, insulin pumps, and cochlear implants. The method depicted in FIG. 2 proceeds from the perspective of an implantable medical device authenticating an external device. The method of FIG. 2 begins at step 210 wherein the implantable medical device receives a patient ID from a manufacturer. In some embodiments this may take place at the time of manufacture for the implantable medical device. In some other embodiments this step may take place at a later time when the implantable medical device is activated. At step 210 the patient ID is stored on a memory device of the implantable medical device. As will be appreciated by those skilled in the art, the memory device may be embodied as a hard drive, solid state drive (SSD), or any other suitable non-volatile storage medium.

Proceeding to step 230, the implantable medical device receives a pair request from the external device. Next, at step 240, the implantable medical device receives an authentication request from the external device that includes a partial digital certificate including partial certificate information including the patient ID and an external ID corresponding to the external device. In some embodiments, additional information may be provided within the authentication request. The partial certificate transmitted by the external device and received by the implantable medical device omits at least one authentication factor. In one or more embodiments, the partial certificate information of the partial certificate omits at least one authentication factor, such as a knowledge factor (e.g., a password; a PIN code; an ID number, or other personal information; or location data), a possession factor (e.g., an ID card or chip or a smart device such as a smart phone or tablet computer), and/or an inherence factor (e.g., location data and/or biometric data, such as a fingerprint, an iris scan, a vocal sample, or speech patterns, other attributes specific to the identity of the external device or a user of the external device). In one or more embodiments, the partial certificate may omit two or more authentication factors, and all of the omitted authentication factors may be of the same authentication factor type, or the omitted authentication factors may be from two or more different authentication factor types. The partial digital certificate also includes a digital signature encrypting a first hash of a combination of the partial certificate information and the omitted authentication factor(s) (i.e., the encrypted first hash corresponds to complete certification information). As discussed previously, any suitable digital signing algorithm may be used within the scope of the present disclosure (e.g., DSA, ECDSA, RSA, or ECRSA).

At step 250, the implantable medical device obtains the partial certificate information from the partial digital certificate, decrypts the signature of the partial digital certificate with a certificate authority's public key corresponding to the certificate authority's private key to obtain the first hash, and obtains or supplies the one or more omitted authentication factors of the partial certificate. In some embodiments, the omitted authentication factor(s) may be obtained from the memory device of the implantable medical device. In some embodiments, the omitted authentication factor(s) may be obtained by a receiver of the implantable medical device that receives a communication wirelessly (e.g., from a network). For example, the omitted authentication factor(s) may be received from the external device. The omitted authentication factor(s) obtained or supplied by the implantable medical device may include, but is not limited to, textual information, a time stamp, and location data (e.g., GPS signal data). In still other embodiments, the omitted authentication factor(s) may be obtained by a component of the implantable medical device such as an internal clock or a biometric sensor.

Moving to step 260, the one or more obtained or supplied omitted authentication factor(s) is/are combined with the partial certificate information to reproduce the complete certificate as signed. Then, at step 270, a hashing algorithm is applied to the combined partial certificate information and the one or more omitted authentication factors to create a second hash.

Having generated a second hash from complete certificate information (i.e., a combination of the partial certificate information and the one or more omitted authentication factor(s)), the implantable medical device at step 280 compares the second hash against the first hash of the partial digital certificate. Because of the operation of the hashing algorithm, the first hash and the second hash will match only if the one or more authentication factors obtained or supplied by the implantable medical device accurately corresponds to the information omitted from the partial certificate. In one or more embodiments, at step 470, the digital signature is verified using a process that corresponds to the digital signing algorithm used to generate the signature of the partial digital certificate. Because of the operation of the digital signing algorithm, the signature will pass verification only if the one or more authentication factors obtained or supplied by the implantable medical device accurately corresponds to the information omitted from the partial certificate. As discussed previously, any suitable digital signing algorithm may be used within the scope of the present disclosure (e.g., DSA, ECDSA, RSA, or ECRSA). If the first hash and the second hash do not match (i.e., the digital signature verification failed), then authentication has failed and the method proceed to step 290 where the authentication request is rejected. In some embodiments, this rejection may include transmitting a rejection to the external device. If the first hash and the second hash match (i.e., the digital signature verification passes), then the method proceeds to step 292 wherein an acceptance is transmitted to the external device. This completes the authentication process for the external device, and it becomes available to open an encrypted communication channel with the implantable medical device.

Figure 3:
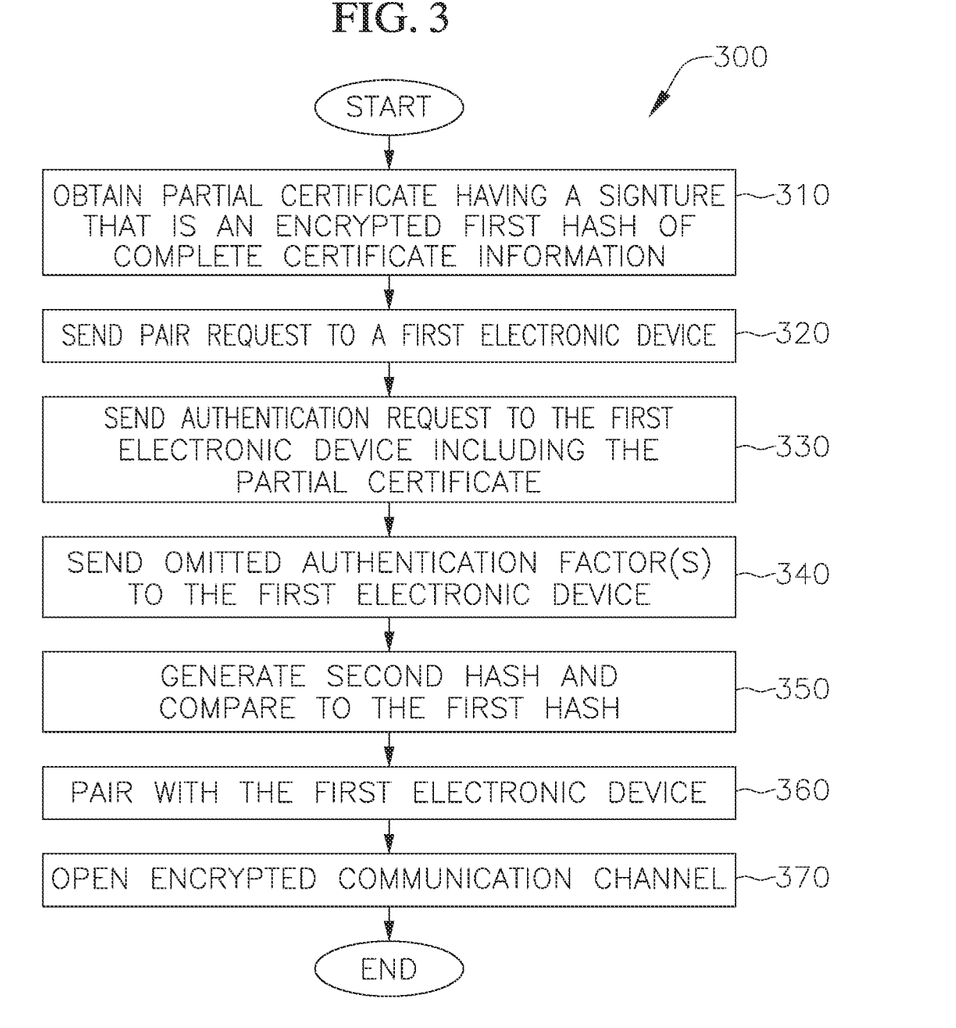
FIG. 3 shows a flowchart depicting a method for single-certificate multi-factor authentication according to one embodiment of the present disclosure from the perspective of a second electronic device.

FIG. 3 shows a flowchart depicting a method 300 for single-certificate multi-factor authentication according to one embodiment of the present disclosure from the perspective of a second electronic device. At step 310, prior to making an authentication request, the second electronic device obtains or is otherwise provided with a partial digital certificate including partial certificate information (e.g., information relevant to the identity of the certificate holder, certificate issuer, etc.), but it omits at least one authentication factor from complete certificate information. In task 310, the partial digital certificate may be obtained from another electronic device, such as a certificate authority server, or it may be provided to the second electronic device during manufacture. After the partial digital certificate has been obtained in task 310, it may be stored in a memory device of the second electronic device for future use.

In one or more embodiments, the at least one authentication factor omitted from the partial digital certificate may be a knowledge factor (e.g., a password; an answer to a secret question, a PIN code; an ID number, or other personal information), a possession factor (e.g., an ID card or chip; a smart device such as a smart phone or tablet computer), and/or an inherence factor (e.g., biometric data, such as a fingerprint, an iris scan, a vocal sample, or speech patterns, other attributes specific to the identity of a device or a user of the device on the network or other secure system). In one or more embodiments, the partial digital certificate may omit two or more authentication factors, and all of the omitted authentication factors may be of the same authentication factor type, or the omitted authentication factors may be from two or more different authentication factor types.

The partial digital certificate also includes a digital signature encrypting a first hash of the complete certificate information with a certificate authority's private key (i.e., an encrypted hash of a combination of the partial certificate information and the one or more omitted authentication factors). The signature may be generated with any suitable digital signing algorithm, such as a standard Digital Signing Algorithm (DSA), an elliptic curve digital signature algorithm (ECDSA), a Rivest-Shamir_Adleman (RSA) algorithm, or an elliptic curve RSA algorithm (ECRSA).

In one or more embodiments in which the partial certificate information omits two or more authentication factors (i.e., a plurality of authentication factors), the partial digital certificate may include two or more digital signatures encrypting two or more first hashes (i.e., a plurality of digital signatures encrypting a respective plurality of first hashes) corresponding to combinations of the partial certificate information with a different omitted authentication factor(s). For example, in one or more embodiments, the partial digital certificate may include a first digital signature (i.e., a first encrypted hash) corresponding to a combination of the partial certificate information with one omitted authentication factor, and a second digital signature (i.e., a second encrypted hash) corresponding to a combination of the partial certificate information with another omitted authentication factor. In one or more embodiments, the partial digital certificate may include two or more digital signatures encrypting two or more first hashes corresponding to combinations of the partial certificate information with the same omitted authentication factor (e.g., a single omitted authentication factor), but having two or more different values for that omitted authentication factor. For instance, in one or more embodiments, an omitted authentication factor may be a password field, and the partial digital certificate may include a first digital signature (i.e., a first encrypted hash) corresponding to a combination of the partial certificate information with a first acceptable password, and a second digital signature (i.e., a second encrypted hash) corresponding to a combination of the partial certificate information with a second acceptable password.

Proceeding to the authentication process, at step 320, the second electronic device sends a pair request to the first electronic device. As will be appreciated by those skilled in the art, the pairing request may make use of any wireless communication protocol, such as Wi-Fi or Bluetooth®, and the request may include multiple component pieces of information.

Subsequent to the establishment of a communication channel in response to the pair request in task 320, the second electronic device may send to the first electronic device an authentication request including the partial digital certificate having a signature encrypting the first hash and the partial certificate information with a private key (step 330). As described previously, the partial digital certificate having the digital signature and the partial certificate information may, in some embodiments, omit one or more authentication factors, i.e., component pieces of information corresponding to the complete certificate that are required to form the signature (i.e., the encrypted first hash). In one or more embodiments, the partial certificate omits at least one authentication factor, such as a knowledge factor (e.g., a password; a PIN code; an ID number, or other personal information; or location data), a possession factor (e.g., an ID card or chip, or a smart device such as a smart phone or tablet computer), and/or an inherence factor (e.g., location data and/or biometric data, such as a fingerprint, an iris scan, a vocal sample, or speech patterns, other attributes specific to the identity of the second electronic device or a user of the second electronic device).

Additionally, in one or more embodiments, the method includes a task 340 of the second electronic device transmitting one or more authentication factors (e.g., a password, a PIN number, an answer to a secret question, biometric information of a user of the second electronic device, or combinations thereof) to the first electronic device. In one or more embodiments, the second electronic device may supply or obtain the one or more authentication factors (e.g., the second electronic device may obtain a time stamp from an internal clock, may obtain GPS coordinates from a GPS device, or may supply a unique device identification number of the second electronic device). However, in one or more embodiments in which the one or more omitted authentication factors are obtained or supplied by the first electronic device, the method may not include the task 340 of transmitting the one or more omitted authentication factors from the second electronic device to the first electronic device.

The authentication process proceeds to step 350 wherein the second electronic device is authenticated by the first electronic device in response to the first electronic device decrypting the signature with a public key corresponding to the private key to obtain the first hash, generating a second hash from a combination of the partial certificate information and the one or more omitted authentication factors, and confirming that the second hash matches the first hash.

If the verification is successful in step 350 then the second electronic device is fully authenticated and the process proceeds to step 360 wherein the second electronic device pairs with the first electronic device. Upon successful pairing of the electronic devices, an encrypted communication channel may, in some embodiments, be opened to facilitate secure transmission of data packets between the first and second electronic devices at step 370.

Figure 4:
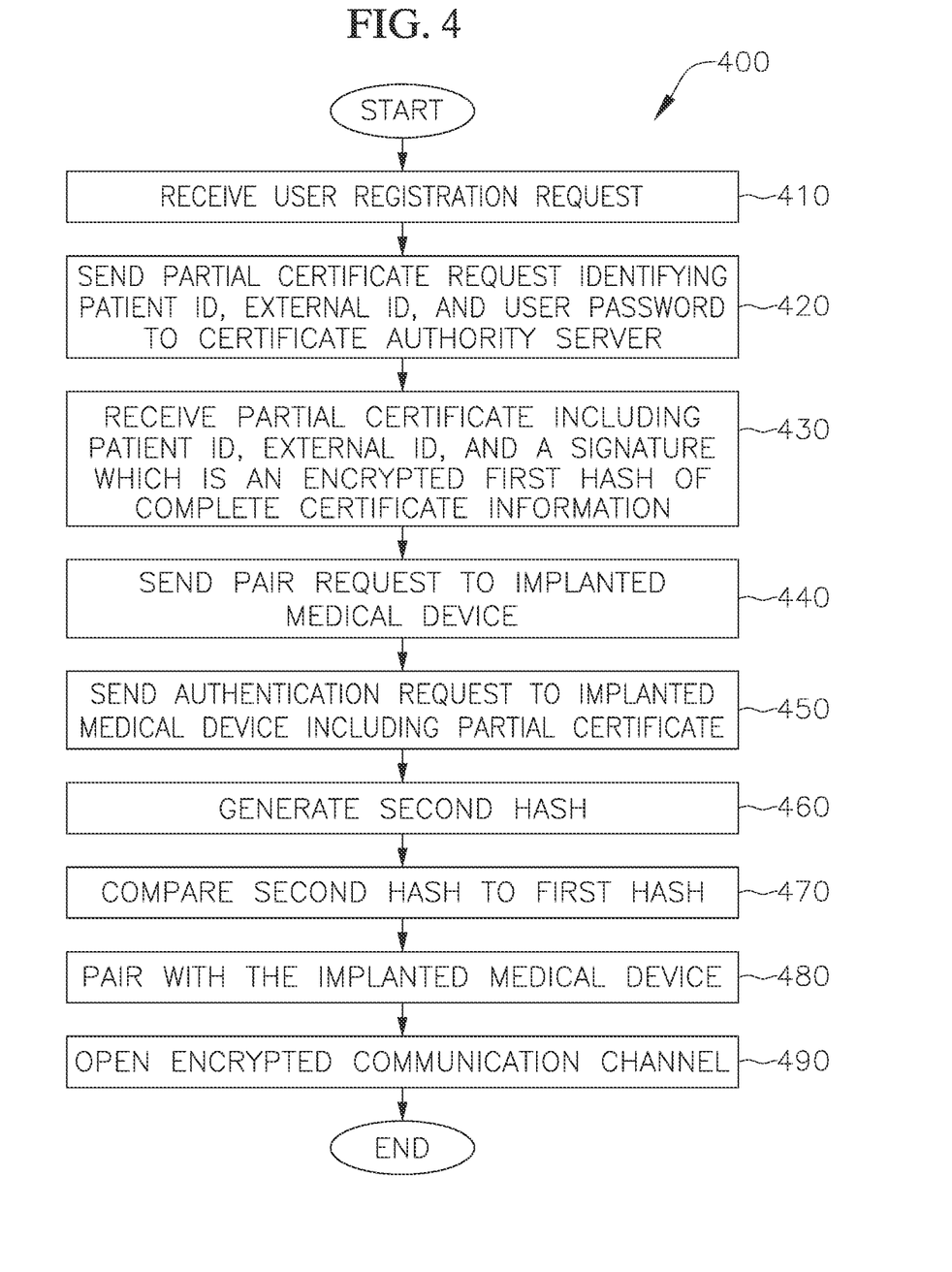
FIG. 4 shows a flowchart depicting an alternative method for single-certificate multi-factor authentication according to one embodiment of the present disclosure from the perspective of a second electronic device.

FIG. 4 shows a flowchart depicting an alternative method 400 for single-certificate multi-factor authentication according to one embodiment of the present disclosure from the perspective of an external device. The external device may be embodied as any suitable electronic device, such as, but not limited to, a personal computer, a laptop, a smart phone or tablet device, or other electronic device configured to receive user input and display received data. The method begins at step 410 wherein a user registration request is received by the external device from its user. In response to receiving the user registration request, the external device sends a partial certificate request identifying a patient ID, an external ID, and a user password to a certificate authority server at step 420. As will be appreciated by those skilled in the art, this request may be sent to the certificate authority server over any suitable network. Additionally, the registration request may include additional information and processing of the request by the certificate authority server may require additional steps. Once the certificate authority server processes the request, it sends to the external device a partial certificate including partial certificate information including the patient ID and the external ID at step 430. The partial certificate information omits at least one authentication factor from complete certificate information. The partial digital certificate also includes a digital signature encrypting a hash of the complete certificate information (i.e., an encrypted hash of a combination of the partial certificate information and the omitted authentication factor(s)). The omitted authentication factor(s) may be a knowledge factor (e.g., a password; a PIN code; an ID number, or other personal information; or location data), a possession factor (e.g., an ID card or chip, or a smart device such as a smart phone or tablet computer), and/or an inherence factor (e.g., location data and/or biometric data, such as a fingerprint, an iris scan, a vocal sample, or speech patterns, other attributes specific to the identity of the external device or a user of the external device). In one or more embodiments, the partial certificate may omit two or more authentication factors, and all of the omitted authentication factors may be of the same authentication factor type, or the omitted authentication factors may be from two or more different authentication factor types. In one or more embodiments, once the user registration is complete, the partial certificate is stored on the external device such that a new certificate does not need to be requested with each login attempt.

Once in possession of the partial certificate, at step 440, the external device sends a pair request to an implanted medical device. As will be appreciated by one skilled in the art, the implanted medical device may be embodied as any medical device configured to communicate wirelessly (e.g., over a network) while implanted in a patient's body. Such devices may include, but are not limited to, pacemakers, insulin pumps, and cochlear implants. Once communication with the implanted medical device is established by the pair request, at step 450, the external device sends an authentication request including the partial certificate to the implanted medical device.

At step 460, the implanted medical device decrypts the digital signature and generates a second hash from a combination of the partial certificate information and the one or more omitted authentication factors. The one or more omitted authentication factors may be supplied by the external device or the implanted medical device. At step 470, the implanted medical device compares the second hash to the first hash of the partial digital certificate.

If the verification is successful (i.e., the second hash matches the first hash), the method proceeds to step 480 in which the external device pairs with the implanted medical device. Finally, at step 490, an encrypted communication channel is opened to provide secure wireless communication between the external device opens and the implanted medical device.

Figure 5:
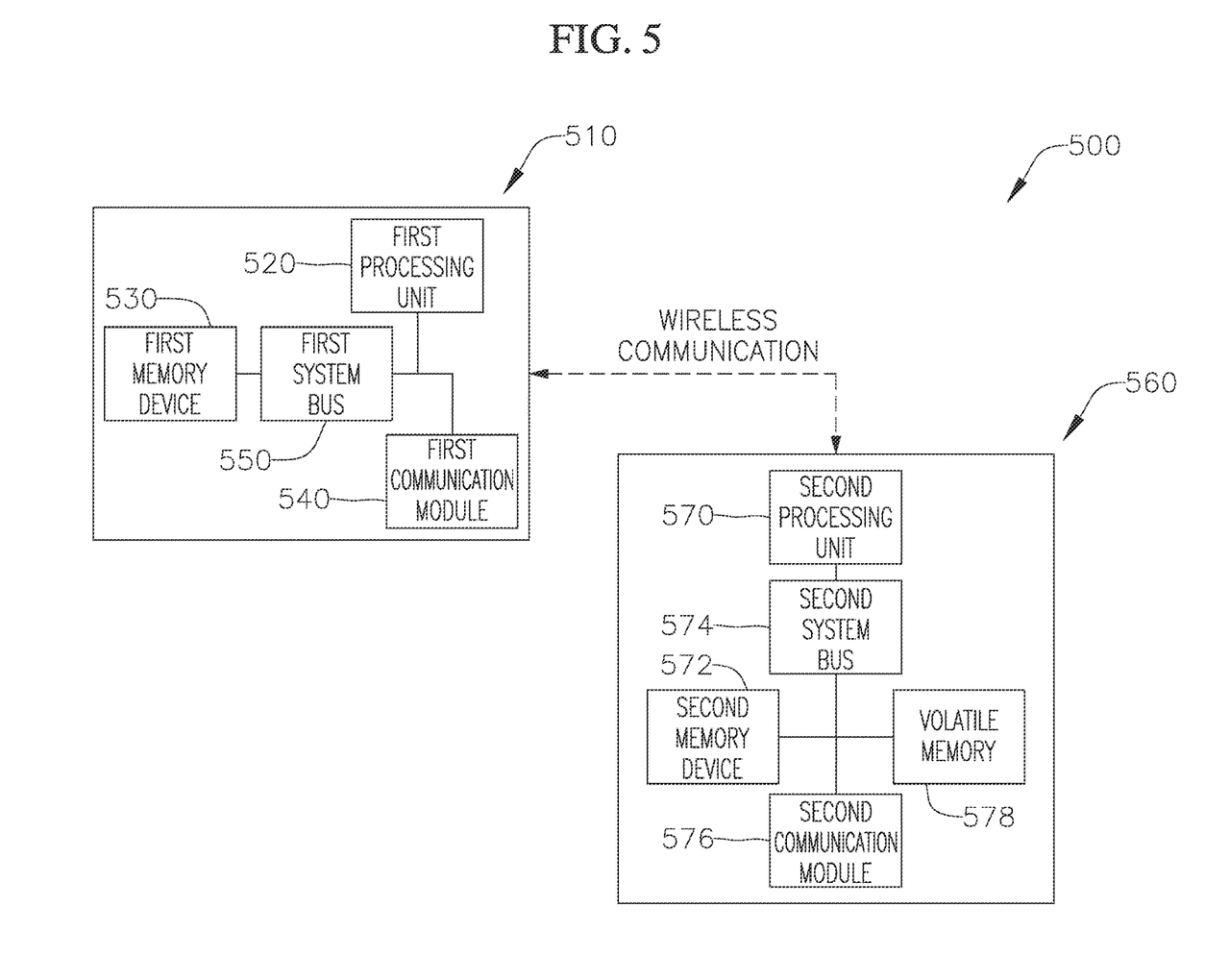
FIG. 5 shows a system configured to provide single-certificate multi-factor authentication for one or more electronic devices according to one embodiment of the present disclosure.

FIG. 5 shows a system 500 configured to provide single-certificate multi-factor authentication for one or more electronic devices according to one embodiment of the present disclosure. The system 500 may, in some embodiments, include a first electronic device 510 and a second electronic device 560. In some embodiments, the first electronic device 510 includes a first processing unit 520, a first memory device 530 and a first communication module 540 that are communicably linked via a first system bus 550. As will be appreciated by one skilled in the art, any suitable first processing unit 520 may be used within the scope of the present disclosure. This may include, but is not limited to, central processing units (CPUs), graphics processing units (GPUs), and field programmable gate arrays (FPGAs). Additionally, any suitable first memory device 530 may be used within the scope of the present disclosure including, but not limited to, hard drives, non-volatile flash memory, and solid-state drives (SSDs). Likewise, the first communication module 540 may be embodied as any device configured to wirelessly communicate with other electronic devices. Any suitable type or protocol for wireless communication may be used within the scope of the present disclosure. This may include, but is not limited to, Bluetooth®, Wi-Fi, cellular networks, and near-field communication (NFC). The first processing unit 520, first memory device 530, and first communication module 540 may, in some embodiments, all be communicably linked via the first bus 550.

The second electronic device 560 may, in some embodiments, include a second processing unit 570, a second memory device 572, a second communication module 576, and a volatile memory 578. These components of the second electronic device 560 may all be communicably linked, in some embodiments, via a second bus 574. As will be appreciated by those skilled in the art, those variations in componentry discussed above in regards to the first electronic device 510 are similarly applicable to the second electronic device 560.

The first electronic device 510 is configured to communicate, via wireless communications sent and received by the first communication module 540, with the second communication module 576 of the second electronic device 560. Likewise, the second electronic device 560 is configured to communicate, via wireless communications sent and received by the second communication module 576, with the first communication module 540 of the first electronic device 560. This allows for pair requests and authentication requests to be sent between the first electronic device 510 and the second electronic device 560.

The second processing unit 570 of the second electronic device 560 may be configured, in some embodiments, to run instructions stored on the second memory device 572 that cause the second processing unit 570 to send pair requests and authentication requests to the first electronic device 510 via the second communication module 576. The instructions stored on the second memory device 572 may further cause the second communication module 576 to transmit the partial digital certificate to the first electronic device 510. The second electronic device 560 may obtain the partial digital certificate from another electronic device, such as a certificate authority server, or the partial digital certificate may be stored in the second memory device 572 during manufacture or setup of the second electronic device 560. As described above, the partial digital certificate includes partial certificate information (e.g., information relevant to the identity of the certificate holder, certificate issuer, etc.), but it omits at least one authentication factor from complete certificate information. In one or more embodiments, the at least one authentication factor omitted from the partial digital certificate may be a knowledge factor (e.g., a password; an answer to a secret question, a PIN code; an ID number, or other personal information), a possession factor (e.g., an ID card or chip; a smart device such as a smart phone or tablet computer), and/or an inherence factor (e.g., biometric data, such as a fingerprint, an iris scan, a vocal sample, or speech patterns, other attributes specific to the identity of a device or a user of the device on the network or other secure system). Furthermore, in one or more embodiments, the partial digital certificate includes a signature encrypting a first hash of the complete certificate information with a certificate authority's private key. The signature may be generated with any suitable digital signing algorithm, such as a standard Digital Signing Algorithm (DSA), an elliptic curve digital signature algorithm (ECDSA), a Rivest-Shamir_Adleman (RSA) algorithm, or an elliptic curve RSA algorithm (ECRSA).

In one or more embodiments, the instructions stored on the second memory device 572 may further cause the second communication module 576 to transmit the one or more omitted authentication factors (e.g., a password, a PIN number, an answer to a secret question, biometric information of a user of the second electronic device, or combinations thereof) to the first electronic device 510.

In some embodiments, the partial digital certificate may be stored only on the volatile memory 578 of the second electronic device 560. This adds additional security to the system, as it allows only for the temporary storage of the partial digital certificate which reduces the likelihood of the partial digital certificate being obtained by an unauthorized party that comes into possession/control of the second electronic device 560.

The first processing unit 520 may, in some embodiments, be configured to run instructions stored on the first memory device 530 that cause it to, in response to the receipt of an authentication request containing the partial digital certificate from the second electronic device 560, obtain the first hash by decrypting the signature of the partial digital certificate with a certificate authority's public key corresponding to the private key used to sign the partial digital certificate. Additionally, the instructions may also cause the first processing unit 520 to obtain or supply one or more omitted authentication factors corresponding to the partial digital certificate and to combine the one or more omitted authentication factors with the partial certificate information listed in the partial digital certificate. In one or more embodiments, the instructions cause the first processing unit 520 to obtain a time stamp from an internal clock, obtain GPS coordinates from a GPS device, and/or supply a unique device identification number of the second electronic device 560. The instructions may also cause the first processing unit 520 to apply a hashing algorithm to the combination of the partial certificate information with the one or more omitted authentication factors, and to generate a second hash. As discussed above, any suitable hashing algorithm may be used within the scope of the present disclosure.

In response to the generation of the complete certificate information and the second hash, the instructions may cause the first processing unit 520 to compare the first hash of the partial digital certificate against the second hash, and, if there is a match, send an authentication acceptance to the second electronic device 560 via the first communication module 540.

Figure 6:
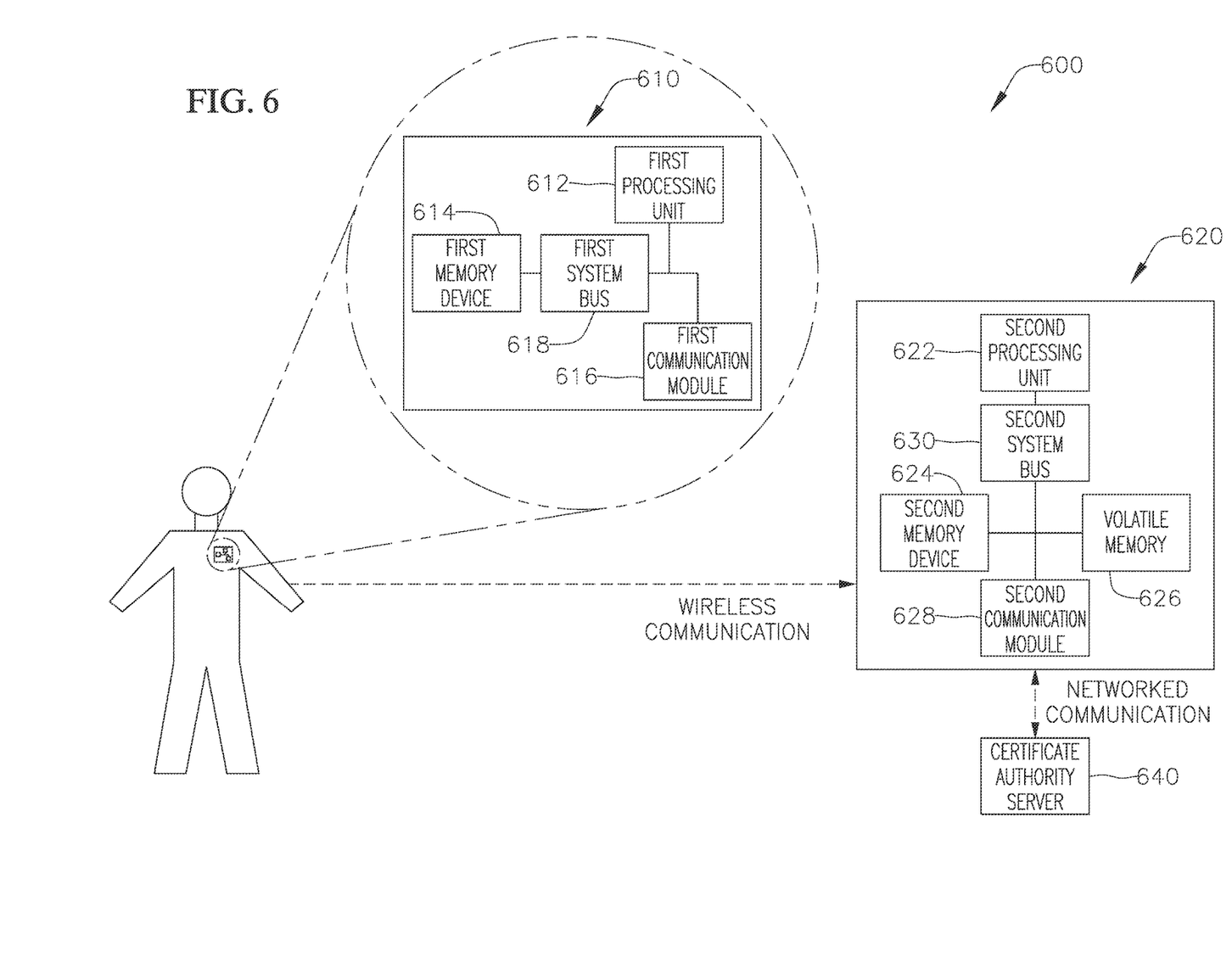
FIG. 6 shows a system configured to provide single-certificate multi-factor authentication for one or more implanted medical devices according to one embodiment of the present disclosure.

FIG. 6 shows a system 600 configured to provide single-certificate multi-factor authentication for one or more implanted medical devices according to one embodiment of the present disclosure. In some embodiments, the system 600 may include an implantable medical device 610, an external device 620, and a certificate authority server 640. As depicted, in some embodiments, the implanted medical device 610 may include a first processing unit 612, a first memory device 614, and a first communication module 616. These components may, in some embodiments, be communicably linked via a first bus 618. As discussed above, in regards to the first electronic device of FIG. 5, any suitable variations of the componentry for the first processing unit 612, the first memory device 614, and the first communication module 616 may be used within the scope of the present disclosure.

The external device 620 may, in some embodiments, include a second processing unit 622, a second memory device 624, a second communication module 628, and a volatile memory 626. These components of the external device 620 may all be communicably linked, in some embodiments, via a second bus 630. As will be appreciated by those skilled in the art, those variations in componentry discussed above in regards to the implantable medical device 610 are similarly applicable to the external device 620.

The certificate authority server 640 may, in some embodiments, be configured to store partial digital certificates and, upon receipt of a proper request for a partial digital certificate, send partial digital certificates to the external device 620 over any suitable network. This network may include, but is not limited to, Internet, Wi-Fi, Bluetooth®, and local area network (LAN) networks.

The external device 620 may be configured, in some embodiments, to store instructions on the second memory device 624 that, when executed by the second processing unit 622, cause the second processing unit 622 to send a partial digital certificate request to the certificate authority server 640 upon the entering of a user registration request. The partial digital certificate request may be transmitted via the second communication module 628. The instructions may also further cause the second processing unit 622 to prepare and send pair requests and authentication requests to the implanted medical device 610 upon the successful receipt of a partial digital certificate from the certificate authority server 640. As described above, the partial digital certificate includes partial certificate information (e.g., information relevant to the identity of the certificate holder, certificate issuer, etc.), but it omits at least one authentication factor from complete certificate information. In one or more embodiments, the partial certificate may omit two or more authentication factors, and all of the omitted authentication factors may be of the same authentication factor type, or the omitted authentication factors may be from two or more different authentication factor types. In one or more embodiments, the at least one authentication factor omitted from the partial digital certificate may be a knowledge factor (e.g., a password; an answer to a secret question, a PIN code; an ID number, or other personal information), a possession factor (e.g., an ID card or chip; a smart device such as a smart phone or tablet computer), and/or an inherence factor (e.g., biometric data, such as a fingerprint, an iris scan, a vocal sample, or speech patterns, other attributes specific to the identity of a device or a user of the device on the network or other secure system). The partial digital certificate also includes a digital signature encrypting a first hash of the complete certificate information with a certificate authority's private key (i.e., an encrypted hash of a combination of the partial certificate information and the one or more omitted authentication factors). The signature may be generated with any suitable digital signing algorithm, such as a standard Digital Signing Algorithm (DSA), an elliptic curve digital signature algorithm (ECDSA), a Rivest-Shamir_Adleman (RSA) algorithm, or an elliptic curve RSA algorithm (ECRSA).

In one or more embodiments, instructions stored on the second memory device 624, when executed by the second processing unit 622, may further cause the second communication module 628 to transmit the one or more omitted authentication factors (e.g., a password, a PIN number, an answer to a secret question, biometric information of a user of the second electronic device, or combinations thereof) to the implanted medical device 610.

The implanted medical device 610 may, in some embodiments, be configured to receive pair requests and authentication requests from the external device 620 via the first communication module 616. In some embodiments, the implanted medical device 610 may be configured to store instructions on the first memory device 614 that, when executed by the first processing unit 612, cause the first processing unit 612 to decrypt the signature of the partial digital certificate to obtain the first hash, and to obtain or supply the one or more omitted authentication factors of the partial certificate in response to the receipt of the partial certificate. In one or more embodiments, the instructions cause the first processing unit 612 to obtain a time stamp from an internal clock, obtain GPS coordinates from a GPS device, and/or supply a unique device identification number of the implanted medical device 610. The instructions may also cause the first processing unit 612 to combine the partial certificate information in the partial digital certificate with the one or more omitted authentication factors and apply a hashing algorithm to the combination of the received partial certificate information and the one or more omitted authentication factors such that a complete certificate and a second hash are generated. Upon the generation of the complete certificate and the second hash, the instructions may further cause the first processing unit 612 to compare the first hash of the partial digital certificate against the second hash and, if there is a match, send an authentication acceptance to the external device 620 and open an encrypted communication channel between the external device 620 and the implanted medical device 610 (i.e., pair the external device 620 with the implanted medical device 610).

Figure 7:
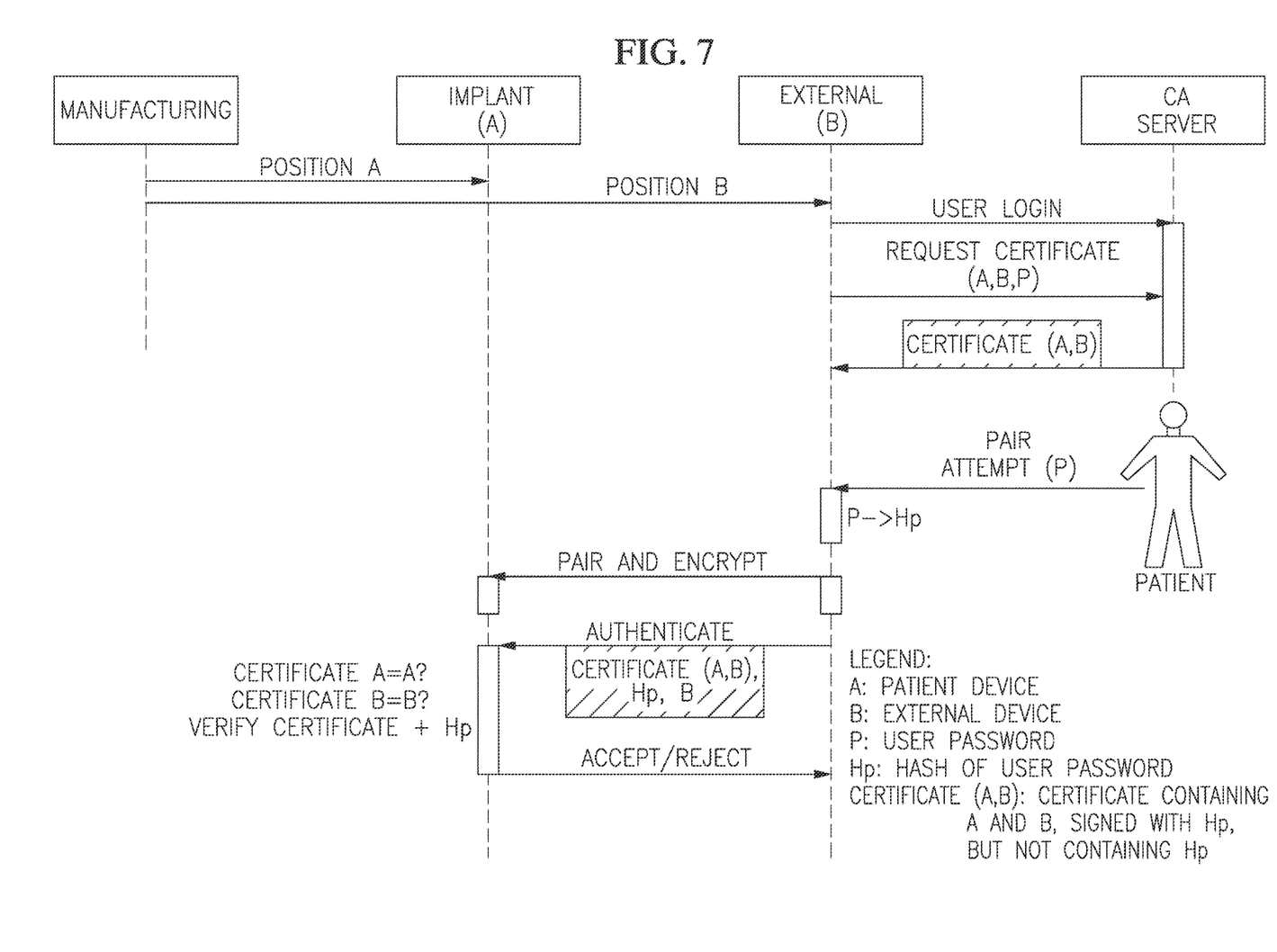
FIG. 7 is a unified modeling language (UML) diagram depicting a system and method for single-certificate multi-factor authentication according to one embodiment of the present disclosure.

FIG. 7 is a unified modeling language (UML) diagram of a system and method of the present disclosure for single-certificate multi-factor authentication. In the illustrated embodiment, an implanted medical device (A) stores a patient ID. The patient ID may be stored in memory of the implanted medical device during manufacturing of the implanted medical device. The implanted medical device may be embodied as any medical device configured to communicate wirelessly over a network while implanted in a patient's body, such as a pacemaker, an insulin pump, or a cochlear implant. An external device (B) stores an external ID. The external ID may be stored in memory of the external device during manufacturing of the external device.

The external device is configured to send a partial digital certificate request to a certificate authority (CA) server during an authenticated session with the user. In some embodiments, the partial certificate request includes the Implant ID (A), the External ID (B), and a user password (P). The certificate authority server generates a partial digital certificate by digital signing a hash of the complete certificate information and then omitting one or more authentication factors from the complete certificate information. Upon receipt of a proper request for a partial digital certificate from the external device, the certificate authority server sends the partial digital certificate to the external device over any suitable network, such as the Internet, Wi-Fi, Bluetooth®, or a local area network (LAN) network.

The partial certificate received by the external device includes partial certificate information including the patient ID and the external ID. The partial digital certificate also includes a digital signature encrypting the partial certificate information and the one or more omitted authentication factors (i.e., an encrypted first hash of the complete certificate information). The partial certificate omits at least one authentication factor utilized by the hashing algorithm to generate the digital signature. In the illustrated embodiment, the omitted authentication factor is a hash (Hp) of the user password (P) provided in the partial certificate request. In one or more embodiments, the omitted authentication factor(s) may be a knowledge factor (e.g., a password; a PIN code; an ID number, or other personal information; or location data), a possession factor (e.g., an ID card or chip, or a smart device such as a smart phone or tablet computer), and/or an inherence factor (e.g., location data and/or biometric data, such as a fingerprint, an iris scan, a vocal sample, or speech patterns, other attributes specific to the identity of the external device or a user of the external device). In one or more embodiments, the partial certificate may omit two or more authentication factors, and all of the omitted authentication factors may be of the same authentication factor type, or the omitted authentication factors may be from two or more different authentication factor types.

Once in possession of the partial certificate, the external device sends a pair request to the implanted medical device. Once communication with the implanted medical device is established by the pair request, the external device sends an authentication request including the partial certificate to the implanted medical device.

The implanted medical device decrypts the digital signature to generate the first hash, and then generates a second hash from a combination of the partial certificate information and the one or more omitted authentication factors. The one or more omitted authentication factors may be supplied by the external device or the implanted medical device. The implanted medical device then compares the second hash to the first hash of the partial digital certificate.

If the verification is successful (i.e., the second hash matches the first hash), the external device pairs with the implanted medical device, and an encrypted communication channel is opened to provide secure wireless communication between the external device and the implanted medical device.

Although some embodiments of the present disclosure are disclosed herein, the present disclosure is not limited thereto, and the scope of the present disclosure is defined by the appended claims and equivalents thereof.

What is claimed is:

1. A method of multi-factor authentication, the method comprising:
receiving, by a first electronic device, a partial digital certificate comprising:
only partial certificate information among complete certificate information, the partial certificate omitting at least one authentication factor from the complete certificate information, and
a digital signature encrypting a first hash of the complete certificate information with a certificate authority private key,
obtaining the first hash by decrypting, by the first electronic device, the digital signature with a certificate authority public key corresponding to the certificate authority private key;
supplying, by the first electronic device, the at least one authentication factor;
generating, by the first electronic device, a second hash based on a combination of the partial certificate information in the partial digital certificate with the at least one authentication factor; and
comparing, by the first electronic device, the second hash to the first hash,
wherein the first electronic device is an implanted medical device, and
wherein the at least one authentication factor comprises a time stamp from an internal clock of the implanted medical device, GPS coordinates of the implanted medical device, and/or a unique identification number of the implanted medical device.

2. The method of claim 1, further comprising:
transmitting, from a second electronic device to the first electronic device, the partial digital certificate; and
authenticating the second electronic device in response to the second hash matching the first hash.

3. The method of claim 1, wherein the at least one authentication factor comprises a plurality of authentication factors.

4. The method of claim 3, wherein the digital signature comprises a plurality of digital signatures, each digital signature of the plurality of digital signatures corresponding to the partial certificate information and one of the plurality of authentication factors.

5. The method of claim 3, wherein the digital signature corresponds to the partial certificate information and each of the plurality of authentication factors.

6. The method of claim 3, wherein the digital signature comprises a plurality of digital signatures, a first digital signature of the plurality of digital signatures corresponding to the partial certificate information and one of the plurality of authentication factors having a first value, and a second digital signature of the plurality of digital signatures corresponding to the partial certificate information and the one of the plurality of authentication factors having a second value different than the first value.

7. The method of claim 1, wherein the at least one authentication factor comprises a knowledge factor selected from the group consisting of a password, a pin code, a unique identifier of the second electronic device, and an answer to a secret question.

8. The method of claim 1, wherein the at least one authentication factor comprises an inherence factor selected from the group consisting of a fingerprint, an iris scan, a vocal sample, and a speech pattern.

9. The method of claim 1, wherein the at least one authentication factor comprises plain-text information.

10. The method of claim 1, wherein a memory of the first electronic device stores the certificate authority public key.

11. The method of claim 1, wherein the digital signature was formed utilizing a signing algorithm selected from the group consisting of a standard Digital Signature Algorithm (DSA), an elliptic curve digital signature algorithm (ECDSA), a Rivest-Shamir-Adleman (RSA) algorithm, and an elliptic curve RSA algorithm (ECRSA).

12. A method of multi-factor authentication, the method comprising:
  transmitting, by a second electronic device, an authentication request to a first electronic device, the authentication request comprising a partial digital certificate comprising:
    only partial certificate information among complete certificate information, the partial certificate information omitting at least one authentication factor from the complete certificate information, and
    a digital signature encrypting a first hash of the complete certificate information with a certificate authority private key;
  receiving, by the first electronic device, the partial digital certificate;
  obtaining the first hash by decrypting, by the first electronic device, the digital signature with a certificate authority public key corresponding to the certificate authority private key;
  supplying, by the first electronic device, the at least one authentication factor;
  generating, by the first electronic device, a second hash based on a combination of the partial certificate information in the partial digital certificate with the at least one authentication factor; and
  comparing, by the first electronic device, the second hash to the first hash,
  wherein the first electronic device is an implanted medical device, and
  wherein the at least one authentication factor comprises a time stamp from an internal clock of the implanted medical device, GPS coordinates of the implanted medical device, and/or a unique identification number of the implanted medical device.

13. The method of claim 12, further comprising authenticating the second electronic device in response to the second hash matching the first hash.

14. The method of claim 12, wherein the at least one authentication factor comprises a plurality of authentication factors.

15. The method of claim 14, wherein the digital signature comprises a plurality of digital signatures, each digital signature of the plurality of digital signatures corresponding to the partial certificate information and one of the plurality of authentication factors.

16. The method of claim 14, wherein the digital signature corresponds to the partial certificate information and each of the plurality of authentication factors.

17. The method of claim 14, wherein the digital signature comprises a plurality of digital signatures, a first digital signature of the plurality of digital signatures corresponding to the partial certificate information and one of the plurality of authentication factors having a first value, and a second digital signature of the plurality of digital signatures corresponding to the partial certificate information and the one of the plurality of authentication factors having a second value different than the first value.

18. The method of claim 12, wherein the at least one authentication factor comprises a knowledge factor selected from the group consisting of a password, a pin code, a unique identifier of the second electronic device, and an answer to a secret question.

19. The method of claim 12, wherein the at least one authentication factor comprises an inherence factor selected from the group consisting of a fingerprint, an iris scan, a vocal sample, and a speech pattern.

20. The method of claim 12, further comprising receiving, by the first electronic device, the at least one authentication factor from the second electronic device.

21. The method of claim 12, further comprising supplying, by the first electronic device, the at least one authentication factor.

22. The method of claim 12, wherein the at least one authentication factor comprises plain-text information.

23. The method of claim 12, wherein the digital signature was formed utilizing a signing algorithm selected from the group consisting of a standard Digital Signature Algorithm (DSA), an elliptic curve digital signature algorithm (ECDSA), a Rivest-Shamir-Adleman (RSA) algorithm, and an elliptic curve RSA algorithm (ECRSA).

24. A system for single-certificate multi-factor authentication, comprising:
  a first electronic device and a second electronic device, each of the first electronic device and the second electronic device comprising:
    a processing unit;
    a memory device, the memory device containing instructions executable by the processing unit;
    a communication module; and
    a system bus communicably linking the processing unit, the memory device, and the communication module,
  wherein the instructions stored in the memory device of the second electronic device, when executed by the processing unit of the second electronic device, cause the communication module of the second electronic device to transmit an authentication request to the first electronic, the authentication request comprising a partial digital certificate comprising:
    only partial certificate information among complete certificate information, the partial certificate information omitting at least one authentication factor from the complete certificate information, and
    a digital signature encrypting a first hash of the complete certificate information with a certificate authority private key, and
  wherein the instructions stored in the memory device of the first electronic device, when executed by the processing unit of the first electronic device, cause the first electronic device to:
    decrypt the digital signature with a certificate authority public key corresponding to the certificate authority private key to obtain the first hash;
    supply the at least one authentication factor;
    generate a second hash based on the partial certificate information in the partial digital certificate and the at least one authentication factor; and
    compare the second hash to the first hash,
  wherein the first electronic device is an implanted medical device, and
  wherein the at least one authentication factor comprises a time stamp from an internal clock of the implanted medical device, GPS coordinates of the implanted medical device, and/or a unique identification number of the implanted medical device.

25. The system of claim 24, wherein the instructions stored in the memory device of the first electronic device, when executed by the processing unit of the first electronic device, further cause the first electronic device to authenticate the second electronic device in response to the second hash matching the first hash.

26. The system of claim 24, wherein the at least one authentication factor comprises a plurality of authentication factors.

27. The system of claim 26, wherein the digital signature comprises a plurality of digital signatures, each digital signature of the plurality of digital signatures corresponding to the partial certificate information and one of the plurality of authentication factors.

28. The system of claim 26, wherein the digital signature corresponds to the partial certificate information and each of the plurality of authentication factors.

29. The system of claim 26, wherein the at least one authentication factor comprises a knowledge factor selected from the group consisting of a password, a pin code, a unique identifier of the second electronic device, and an answer to a secret question.

30. The system of claim 26, wherein the digital signature comprises a plurality of digital signatures, a first digital signature of the plurality of digital signatures corresponding to the partial certificate information and one of the plurality of authentication factors having a first value, and a second digital signature of the plurality of digital signatures corresponding to the partial certificate information and the one of the plurality of authentication factors having a second value different than the first value.

31. The system of claim 24, wherein the at least one authentication factor comprises an inherence factor selected from the group consisting of a fingerprint, an iris scan, a vocal sample, and a speech pattern.

32. The system of claim 24, wherein the instructions stored in the memory device of the second electronic device, when executed by the processing unit of the second electronic device, further cause the second electronic device to transmit the at least one authentication factor to the first electronic device.

33. The system of claim 24, wherein the instructions stored in the memory device of the first electronic device, when executed by the processing unit of the first electronic device, further cause the second electronic device to supply the at least one authentication factor.

34. The system of claim 24, wherein the at least one authentication factor comprises plain-text information.

* * * * *